Feb. 25, 1969 S. J. MARKOWSKI 3,429,509
COOLING SCHEME FOR A THREE BEARING SWIVEL NOZZLE
Filed May 31, 1967 Sheet _1_ of 2
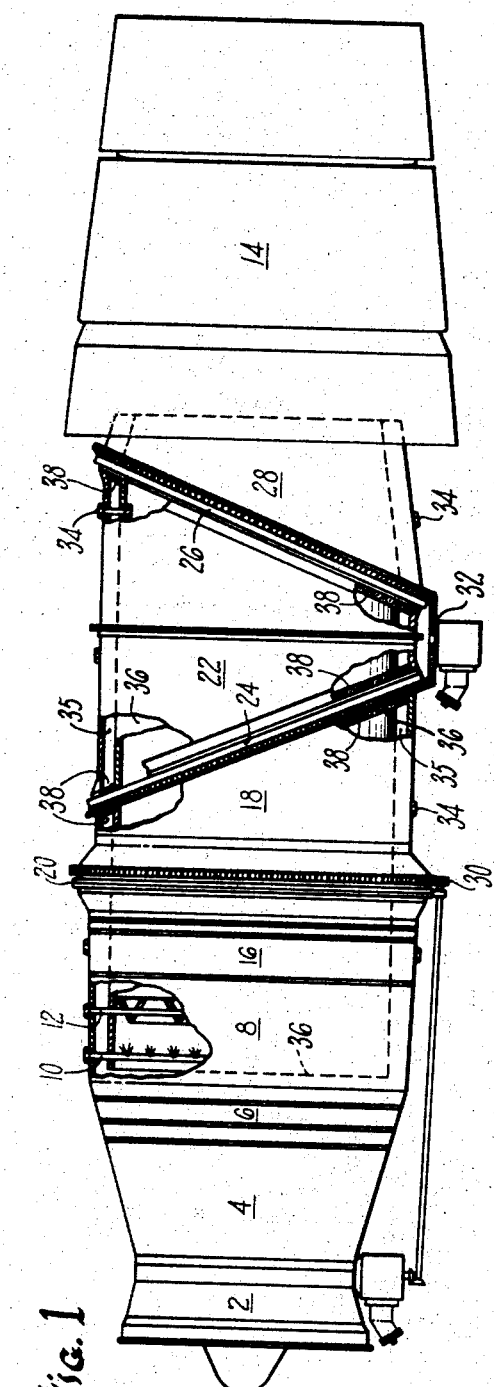
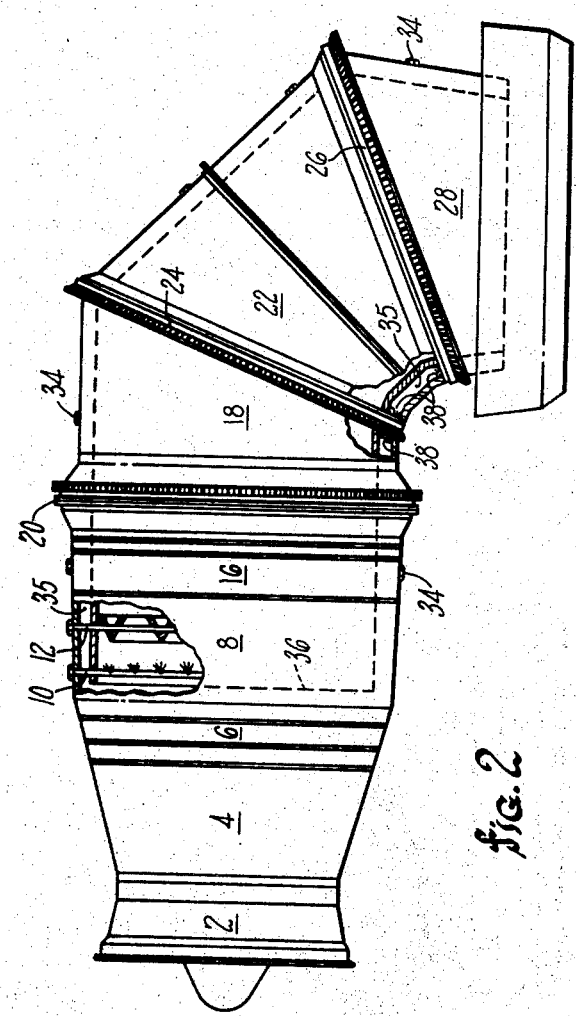
INVENTOR.
STANLEY J. MARKOWSKI
BY
ATTORNEY 0
United States Patent Office 3,429,509
Patented Feb. 25, 1969

3,429,509
COOLING SCHEME FOR A THREE BEARING SWIVEL NOZZLE
Stanley J. Markowski, East Hartford, Conn., assignor to United Aircraft Corporation, East Hartford, Conn., a corporation of Delaware
Filed May 31, 1967, Ser. No. 642,597
U.S. Cl. 239—127.3                    8 Claims
Int. Cl. B64d *33/04;* B64c *15/08*

ABSTRACT OF THE DISCLOSURE

A swivelable exhaust deflection apparatus for use in conjunction with an afterburning gas turbine engine. The device is capable of providing either an axial exhaust or a deflected exhaust depending on the engine requirements, the different configurations being obtained by rotating segments which comprise the deflection apparatus.

Background of the invention

This invention relates to a swivelable exhaust deflection apparatus for deflecting a gas stream of an afterburning gas turbine engine principally adapted for powering vertical takeoff and landing aircraft.

Normally in an afterburning engine, an axial flow exhaust is employed; however, with the advent of vertical takeoff and landing aircraft, a requirement has arisen whereby the exhaust of the engine should be directed in a downward direction for at least part of the flight regime. The problem with employing an afterburner is that since the temperature of the exhaust generally exceeds 2000° F. and as a result of the gas flow characteristics through a curved duct, the hot gases will impinge on the outer radius of the deflector at the bend and cause it to burn through.

The greatest problem of using an afterburner with deflection apparatus is the flow characteristic of the exhaust gases as they pass through the curved deflector. Normally, when in the deflected mode, a large static pressure difference across the duct exists, that is, from the outside radius to the inside radius of the bend of the deflector. This static pressure difference causes a buildup of cooling air flow along the inside radius where the cooling requirements are less severe than along the outer radius of the deflector. For a more complete description of flow characteristics through a curved duct, reference is hereby made to U.S. application Ser. No. 599,996, now Patent No. 3,393,516, entitled "Curved Exhaust Deflector" by Stanley J. Markowski, and assigned to the assignee of the present invention.

While this prior application recognized that cooling air piles up along the inner radius of the bend of the deflector rather than the critical outer radius, the present invention is distinguishable therefrom in that the prior application was directed at a fixed curved exhaust deflection apparatus and the deflection apparatus described hereinafter is a swivelable deflection apparatus which includes a cooling liner.

Summary of the invention

It is the primary object of this invention to provide a swiveled deflection apparatus for deflecting the exhaust stream of an afterburning gas turbine engine.

The present invention relates to a swivel deflector employing a plurality of bearing support means to permit rotation of a plurality of nozzle segments which are also supported by the bearing means, this apparatus permitting both afterburning or augmentation and exhaust stream deflection to be accomplished simultaneously or individually.

As is typical in an afterburner, a cooling or screech liner is employed, the cooling liner being fastened to and spaced radially from the nozzle segments and forming a passage for the cooling air therebetween. The cooling liner is interrupted or broken at each of the bearing supporting means thereby permitting the cooling liner to rotate with its supporting nozzle segment. The cooling air in said passages, which cools the liner by local cooling air velocity or by film cooling, is subjected to the characteristic across the deflector duct static pressure differential by virtue of being vented to the hot gas stream static pressure distribution at the bearing supporting locations. As a result of this pressure differential characteristic, the cooling air grossly overcools the inside radius of the afterburner deflector while grossly undercooling the critical outside radial portions.

The present invention prevents this undercooling of the outside radius by either of two approaches. First, a plurality of localized resistances, which actually throttle the cooling flow, are arranged within the passage between the liner and the nozzle segments so that during the horizontal mode of operation an essentially axi-symmetric net flow pattern is maintained; however, during the deflected mode of operation the local resistances will rotate to an in-line position along the inner radius of the afterburner deflector thereby providing a large flow resistance along the inside radius while providing relatively little flow resistance along the outside radius of the bend of the deflector. A second approach is the use of a cooling louvre, in the liner, with one or more openings. The cooling louvre is positioned within the liner such that it crosses over a bearing supporting means from one rotatable segment to an adjacent rotatable segment; and, therefore, when the adjacent segments are rotated to the deflected mode, a greater number of cooling slots are positioned along the outer radius of the deflector bend. This permit a greater amount of film cooling to occur along the critical hot outer radius of the deflector.

Brief description of the drawings

FIGURE 1 is a plan view of a gas turbine engine, with portions cut away, showing the device of the invention, in an axial exhaust mode.

FIGURE 2 is a side view of a gas turbine engine, with portions cut away, showing the device of the invention, in the curved deflector exhaust mode.

Description of the preferred embodiments

Figure 3:
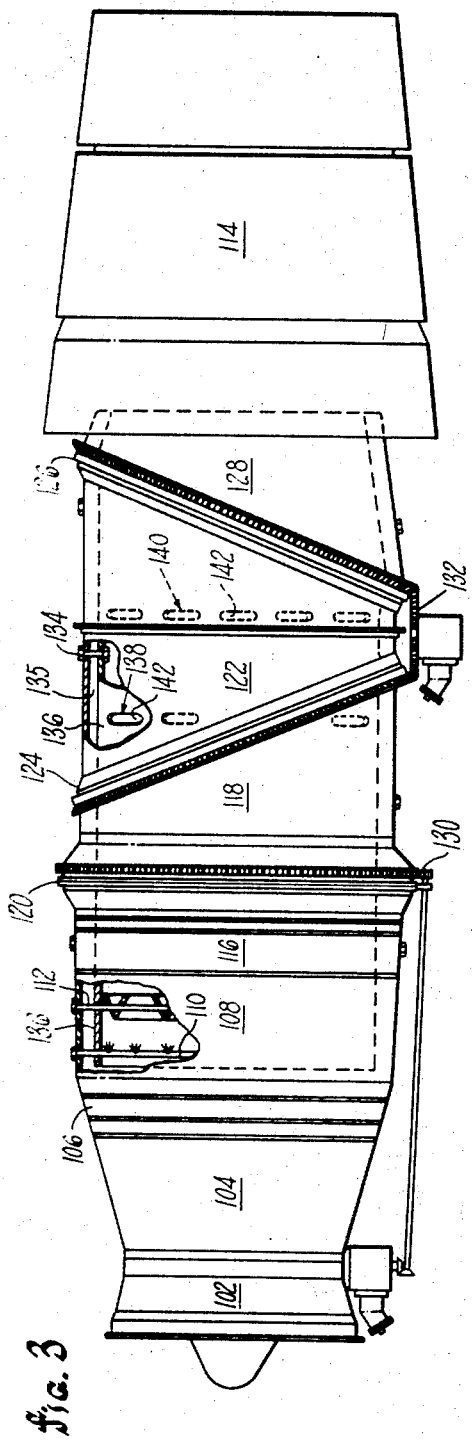
FIGURE 3 is a plan view of a gas turbine engine, with portions cut away, showing the device of the invention, in an axial exhaust mode.

As shown in the drawings, air passes through compressor 2, burner section 4, turbine 6 and is then discharged to atmosphere through an exhaust, hereinafter described, thereby generating thrust. To obtain supersonic speeds, afterburner 8 is used; however, as previously described, the use of an afterburner with a curved exhaust has been severely hampered because the flow of hot exhaust gases impinge upon the outer radius of the deflector wall causing it to burn through. A more detailed analysis of this problem is made in U.S. application No. 599,996, entitled "Curved Exhaust Deflector" by Stanley J. Markowski and assigned to the assignee of the present invention.

Referring first to FIGURES 1 and 2, afterburner 8 is connected downstream of turbine 6 to receive the exhaust gases therefrom and includes fuel nozzles 10 and flame-holders 12. Connected downstream of afterburner 8 is exhaust nozzle 14. As shown, exhaust nozzle 14 is comprised of fixed and swivelable or rotatable nozzle segments. First nozzle segment 16 is fixed and is connected to rotatable second nozzle segment 18 by bearing support means 20. Third nozzle segment 22 is connected to the downstream end of segment 18 by bearing support means 24 and is also rotatable. Connected by bearing support 26 to the downstream side of nozzle segment 22 is rotatable fourth nozzle segment 28.

Bearing support means for rotatable swivel nozzles are known in the prior art and bearing support means 20, 24 and 26 may be of the type described in U.S. Patent No. 3,143,354 entitled "Seal for Swivelled Nozzle" by P. P. Newcomb et al. and assigned to the assignee of the present invention. As shown in FIGURE 1, the engine is in an axial exhaust configuration. FIGURE 2 illustrates the engine in a curved deflector configuration and to reach this configuration, second segment 18 and fourth segment 28 have been rotated ninety degrees clockwise, with respect to the axis of the associated bearing support means, by actuating means 30 and 32, and third segment 22 has been rotated ninety degrees counterclockwise with respect to the axis of the associated bearing support means by actuating means 32. The plane of reference for the rotations herein described is looking forward from the rear of the engine.

Supported within afterburner 8 and within each of the nozzle segments by bolts 34 is cooling or screech liner 36. Cooling liner 36 is concentric with and spaced radially inward from each of the segments and afterburner outer wall forming cooling air passage 35 therebetween. Liner 36 is broken or interrupted at each of the bearing support means so that when the swivelable segments are rotated the cooling liner is also rotated and therefore cooling air passage 35 is maintained in the curved deflector mode.

Positioned within passage 35 are flow resistance means 38. As shown, flow resistance means 38 are located at each bearing support means and are rotatable with each segment. Flow resistance means 38 are arranged so as to provide an axi-symmetric flow pattern when the engine is in the axial exhaust configuration. This is accomplished by placing within segment 18 a flow resistance means that extends 180 degrees circumferentially within passage 35 and placing within adjacent segment 22 another 180 degrees flow resistance means, the outer diameter of this flow resistance means being opposite to the adjacent flow resistance means so that effectively the two flow resistance means form a circle. Therefore, when the segments are rotated to the curved deflector configuration flow resistance means 38 rotate to an in-line position along the inner radius of the bend of the deflector. This causes a flow resistance along the inner radius of the curved deflector while providing none along the outer radius of the curved deflector.

Figure 4:
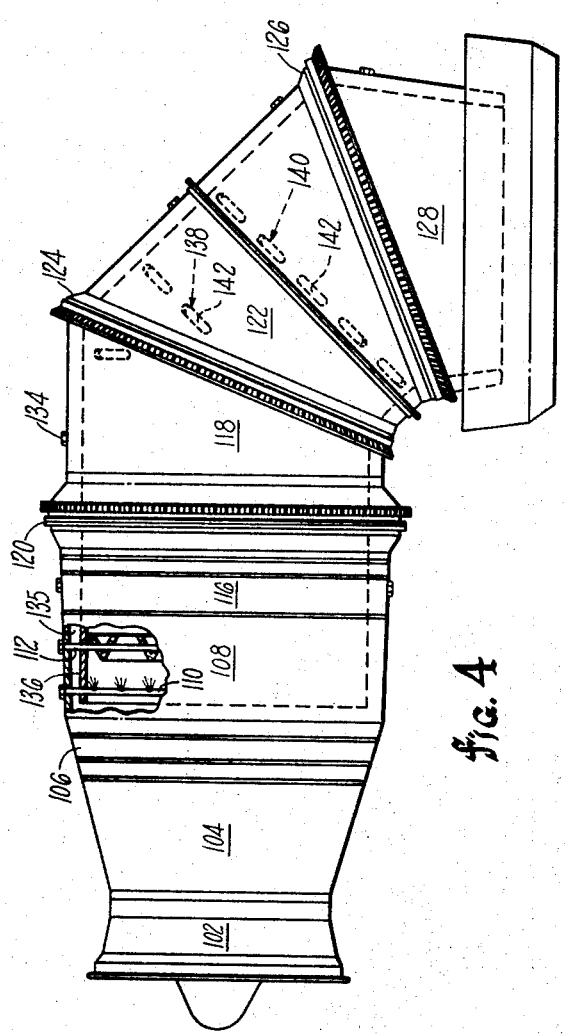
FIGURE 4 is a side view of a gas turbine engine, with portions cut away, showing the device of the invention, in the curved deflector exhaust mode.

A second embodiment of the invention is illustrated in FIGURES 3 and 4. Air passes through compressor 102, burner section 104, turbine 106, afterburner 108 and is then discharged to atmosphere through an exhaust, hereinafter described.

Afterburner 108 contains fuel nozzles 110 and flameholders 112 and downstream therefrom is exhaust nozzle 114. As shown, exhaust nozzle 114 is comprised of fixed and swivelable or rotatable nozzle segments. First nozzle segment 116 is fixed and is connected to swivelable second nozzle segment 118 by bearing support means 120. Third nozzle segment 122 is connected to the downstream end of segment 118 by bearing support means 124 and is also swivelable. Connected by bearing support 126 to the downstream side of nozzle segment 122 is swivelable fourth nozzle segment 128.

FIGURE 3 illustrates the engine in an axial exhaust configuration and FIGURE 4 illustrates a curved deflection configuration. To reach the latter configuration, again looking forward from the rear of the engine, second segment 118 and fourth segment 128 have been rotated ninety degrees clockwise, with respect to the axis of the associated bearing support, by actuating means 130 and 132; and third segment 122 has been rotated ninety degrees counterclockwise with respect to the axis of its associated bearing support means by actuating means 132.

Supported within afterburner 108 and within each of the nozzle segments by bolts 134 is cooling or screech liner 136. Cooling liner 136 is concentric with and spaced radially inward from each of the segments and the afterburner outer wall forming cooling air passage 135 therebetween. Liner 136 is broken or interrupted at each of the bearing support means so that the liner is rotatable with the swivelable nozzle segments, therefore maintaining passages 135 in the curved deflector configuration.

Contained in liner 136 is split louvre 138 and unsplit louvre 140. Split louvre 138 and unsplit louvre 140 may be a groove or a slot within liner 136 and may contain one continuous opening 142 or a plurality of openings around the circumference of liner 136. The purpose of these openings is to insure that passage 135 is always in communication with inner wall 144 of liner 136, thereby providing film cooling for wall 144.

Louvre 138 is split in that the louvre is interrupted at bearing support means 124 and crosses over bearing support 124 from segment 115 to adjacent segment 122. Louvre 140 is unsplit in that it is not interrupted and does not cross over an bearing support means. Since liner 136 rotates with the swivelable nozzle segments, louvre 138 also rotates and when the segments are actuated louvre 138 takes the position as shown in FIGURE 4. By this arrangement an additional cooling louvre is provided along the outer radius of the exhaust deflector bend and a greater amount of cooling air can be supplied to wall 144.

To obtain the maximum cooling effect, flow resistance means 38 of FIGURES 1 and 2 can be combined with louvres 138 and 140 of FIGURES 3 and 4. In this way cooling of liner 36 or 136 would be accomplished by both a velocity effect, that is cooling flow within passage 35, and by a film cooling effect, that is cooling flow along wall 144. It is obvious that if maximum cooling of the liner is not required, then either flow resistance means 38 or cooling louvres 138 and 140 could be used.

I claim:

1. An exhaust deflection apparatus for a gas stream from an engine comprising:

an exhaust duct comprised of a plurality of concentric normally axially aligned fixed and movable nozzle segments, each adjacent movable segment being connected together and supported by bearing means, the segments being rotatable with respect to one another at said bearing means so as to provide a curved deflector;

means for rotating said movable segments;

a cooling liner attached to and extending the full length of said fixed and movable segments, the cooling liner being concentric with and spaced radially inward from said segments, forming a passage therebetween, said liner being interrupted at each of said bearing means and said liner being movable with said movable segments; and A plurality of flow resistance means, individual flow resistance means being provided for each of said segments, each of said flow resistance means extending radially inward from each of said segments within said passage and each of said flow resistance means being circumferentially oriented therewithin, all of said flow resistance means cooperating when said segments are axially aligned to permit an axi-symmetric flow pattern and all of said flow resistance means being in an in-line relationship when the segments are in the curved deflector mode for causing a flow resistance along the inner radius thereof.

2. A deflection apparatus as in claim 1 wherein:
a first segment is fixed;

a second segment is movable clockwise with respect to its bearing axis;

a third segment is movable counterclockwise with respect to its bearing axis;

a fourth segment is movable clockwise with respect to its bearing axis; and flow resistance means are carried by said second and third segments.

3. A deflection apparatus as in claim 2 wherein:

said second and fourth segment each rotate ninety degrees in a clockwise direction and said third segment rotates ninety degrees counterclockwise; and said flow resistance means, when said segments are axially aligned, extend substantially 180 degrees around the circumference of said passage, the flow resistance means being arranged within said passage so that they are in an in-line relationship along the inner radius of said curved deflector.

4. An exhaust deflection apparatus for a gas stream from an engine comprising:

an exhaust duct comprised of a plurality of concentric normally axially aligned fixed and movable nozzle segments, each adjacent movable segment being connected and supported by bearing means, the segments being rotatable with respect to one another with one another at said bearing means so as to provide a curved deflector;

means for rotating said movable segments;

a cooling liner attached to and extending the full length of said fixed and movable segments, the cooling liner being concentric with and spaced radially inward from said segments forming a passage therebetween, said liner being interrupted at each of said bearing means and said liner being movable with said movable segments; and a plurality of split and unsplit cooling louvres in said cooling liner, each of said louvres containing at least one opening, said openings being passages for cooling flow from said passage between said liner and said segments, each unsplit louvre being positioned downstream of an associated unsplit louvre, all of said louvres permitting symmetrical flow therethrough when said segments are axially aligned, and each of the split louvres crossing over said bearing means midspan thereof, from one adjacent segment to another adjacent segment, so that when said segments are rotated to the curved deflector mode, additional cooling flow passages are provided along the inner surface of said liner.

5. A deflection apparatus as in claim 1 comprising:

a fixed first segment;

a second segment movable in a clockwise direction with respect to its bearing axis;

a third segment movable in a counterclockwise direction with respect to its bearing axis;

a fourth segment movable in a clockwise direction with respect to its bearing axis;

a split louvre in said cooling liner in said second segment, said cooling louvre containing at least one slot extending around the periphery of said liner, said louvre crossing over the bearing means for said second segment substantially midspan thereof; and an unsplit louvre in said cooling liner, said unsplit louvre being positioned downstream of said split louvre in said third segment so that when said second and third segments are rotated at least one additional cooling passage is positioned along the outer radius of said curved deflector.

6. The combination with an afterburning gas turbine engine of a swivelable exhaust deflector of:

a duct enclosing the engine exhaust;

a plurality of concentric normally axially aligned movable nozzle segments, said segments connected to said duct and forming an extension thereto, each adjacent movable segment being connected together and supported by bearing means, the segments being rotatable with respect to one another at said bearing means so as to provide a curved deflector;

means for rotating said movable segments;

a cooling liner attached to and extending at least the full length of said movable segments, the cooling liner being spaced radially inward from said segments and forming a passage therebetween, said liner being interrupted at each of said bearing means and said liner being movable with said movable segments; and means for providing an increased amount of cooling flow along the surface of said liner after said segments have been rotated.

7. A combination as in claim 6 wherein:

said means for providing an increased amount of cooling flow within said passage comprises a plurality of flow restrictions connected to said movable segments and arranged within said passage so that when said segments are rotated said flow restrictions are in an in-line relationship along the inner radius of said curved deflector.

8. A combination as in claim 6 wherein:

said means for providing an increased amount of cooling flow along the inner surface of said liner comprises a plurality of split and unsplit louvres in said cooling liner, each of the split louvres crossing over said bearing means from one adjacent movable segment to the next, the split louvres providing additional cooling passages along the outer radius of said curved deflector after said segments have been rotated.

References Cited

UNITED STATES PATENTS

| 3,143,354 | 8/1964 | Newcomb et al. | 257—75 |
| 3,260,049 | 7/1966 | Johnson | 239—265.35 |
| 3,393,516 | 7/1968 | Markowski | 60—204 |

FOREIGN PATENTS

| 1,238,341 | 4/1967 | Germany. |
| 948,571 | 2/1964 | Great Britain. |

EVERETT W. KIRBY, *Primary Examiner.*

U.S. Cl. X.R.

239—265.35; 244—52